United States Patent [19]

O'Donnell et al.

[11] Patent Number: 5,225,178
[45] Date of Patent: Jul. 6, 1993

[54] EXTRACTION AND PURIFICATION OF TITANIUM PRODUCTS FROM TITANIUM BEARING MINERALS

[76] Inventors: Thomas A. O'Donnell, Welfare Parade, Burwood, Victoria, Australia, 3125; David G. Wood, 4/65-67 Park Street, St. Kilda, Victoria, Australia, 3149; Theresa K. H. Pong, 287 Sydney Road, Brunswick, Australia

[21] Appl. No.: 720,457
[22] PCT Filed: Aug. 15, 1991
[86] PCT No.: PCT/AU89/00540
§ 371 Date: Aug. 15, 1991
§ 102(e) Date: Aug. 15, 1991
[87] PCT Pub. No.: WO90/06898
PCT Pub. Date: Jun. 28, 1990

[30] Foreign Application Priority Data

Dec. 20, 1988 [AU] Australia ............................ PJ 2045

[51] Int. Cl.$^5$ ............................................ C01G 23/047
[52] U.S. Cl. ............................... 423/610; 423/78; 423/72; 423/74; 423/341; 423/343
[58] Field of Search ................... 423/72, 74, 343, 341, 423/147, 148, 464, 82, 82, 598, 608, 609, 610, 149, 69, 466

[56] References Cited

U.S. PATENT DOCUMENTS 2,900,234  8/1959  Jackson et al. ...................... 423/72
4,220,629  9/1980  Wyndham et al. .................... 423/76
4,390,365  6/1983  Hard et al. ........................... 75/84.4
4,629,607  12/1986 Gueguin ............................... 423/74
4,629,611  12/1986 Fan ..................................... 423/240

FOREIGN PATENT DOCUMENTS

22885/70  12/1970  Australia .

OTHER PUBLICATIONS

Chlorination of Ilmenite in a Fluidized Bed, L. K. Doraiswamy, et al, Oct. 1959, pp. 80-88.

Primary Examiner—Theodore Morris
Assistant Examiner—Edward Squillante
Attorney, Agent, or Firm—Robbins, Dalgarn, Berliner & Carson

[57] ABSTRACT

Titaniferous solid containing titanium (IV) oxide, for example ilmenite, is reacted with silicon tetrafluoride gas at 800° C. or more and at a pressure of at least 1 atmosphere to produce titanium tetrafluoride vapor and silica. The vapor is rapidly removed from the reaction zone, preferably by rapid cooling to solid titanium tetrafluoride, at a sufficient distance from the reaction zone so as not to quench the reaction. The titanium tetrafluoride may be hydrolysed to produce titanium dioxide and hydrogen fluoride which is combined with silica to regenerate silicon tetrafluoride. It is preferred to pretreat the titaniferous solid by grinding and then roasting at 700° C. to 750° C. in air. Products of the reaction may be separated and purified by condensation and resublimation.

27 Claims, 5 Drawing Sheets

FIG. 4   $P_{SiF_4}$ = 1 atm, Temp = 800°C

Conversion of $TiO_2$ with time

Conversion of TiO$_2$ with SiF$_4$ partial pressure

EXTRACTION AND PURIFICATION OF TITANIUM PRODUCTS FROM TITANIUM BEARING MINERALS

FIELD OF THE INVENTION

This invention relates to a method for the extraction of titanium products occurring in titaniferous minerals, and more particularly to the recovery of titanium tetrafluoride from ilmenite and the like.

BACKGROUND OF THE INVENTION

Titaniferous materials are raw materials which serve as a source for titanium dioxide, titanium metal or other titanium compounds. Commercially viable titaniferous materials contain as low as 10% titanium dioxide and in excess of 95%. Most often the titanium is associated with other mineral types and the titaniferous portion is usually bound with an iron compound. Examples of titaniferous materials include ilmenite, leucoxene, rutile, anatase, titaniferous magnetite, vanadiferous magnetite, certain slags and synthetic rutiles obtained by reduction and leaching of ilmenite sands. The term thus generally includes other titanium bearing sands, ores, concentrates, slags, by-products and the like.

The most commonly mined forms of titanium as oxide are ilmenite and rutile. ilmenite beach sand concentrates typically contain titanium dioxide (40-60%), ferrous oxide (5-19%) and ferric oxide (24-25%) together with other metal oxides and residual silica. ilmenite rock concentrates are generally of lower titanium dioxide yield than sand concentrates. Australian rutile contains upward of 94-95% titanium dioxide with the balance chiefly as iron oxides.

Titanium dioxide in pure form is much in demand as a white pigment of high reflectivity which leads to a high opacity index. Non-pigmentary titanium dioxide is used in the manufacture of ceramics and for the production of titanium metal and for other purposes.

In the traditional "Sulphate" process for the recovery of titanium dioxide, ilmenite is digested with sulphuric acid:

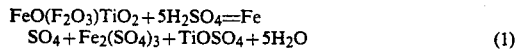

(1)

The liquor is clarified, filtered and mud residues are dumped. The filtered solution is fractionally crystallized under vacuum; iron sulphate being first removed by crystallization and filtration, the titanyl sulphate bearing solution being then concentrated, hydrolysed to an insoluble titanium oxide under critically controlled conditions to avoid occlusion of residual iron salts, and then filtered, washed and calcined. Conduct of the process has generally been considered to be costly and difficult to control and the process cannot be used efficiently with titaniferous minerals containing less than approximately 50% $TiO_2$.

The other major process for the production of titanium oxide is the chloride process which requires a feedstock of high titanium concentration material such as rutile or synthetic rutile. The preferred process on environmental grounds is the chloride process and with the supply of rutile being limited plants must include a synthetic rutile plant.

Titanium tetrachloride is produced by direct chlorination of the rutile in a furnace or fluidised bed. Using petroleum coke mixed with rutile or synthetic rutile and chlorine gas chlorination proceeds rapidly at temperatures in the range of 800°-1000° C. The main products are titanium tetrachloride and carbon monoxide with smaller quantities of carbon dioxide and phosgene.

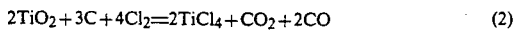

(2)

Titanium tetrachloride is usually oxidised to titanium dioxide by combustion with oxygen.

(3)

On chlorination $Fe_2O_3$ in the titaniferous mineral is converted to $FeCl_3$ which is volatile and must be separated from $TiCl_4$ by fractional distillation. To the extent that there is residual $FeCl_3$ in the $TiCl_4$ the resulting white $TiO_2$ will be discoloured, $FeCl_3$ being converted on oxidation or hydrolysis to brown $Fe_2O_3$.

Both the sulphate and chloride processes suffer from environmental problems and the pigment industry is continually looking for ways of overcoming this major issue and in the case of the chloride process there is a need for feedstock of high titanium content such as rutile or synthetic rutile.

In other suggested processes, the ilmenite has been digested with hydrochloric or nitric acids but these processes have not proven advantageous.

Australian Patent No. 468,091 suggests a process in which ilmenite reacts with ferric trifluoride at elevated temperature typically 800°-900° C. to yield titanium tetrafluoride.

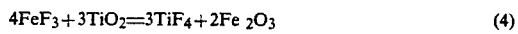

(4)

That process suffers from the disadvantage that ferric fluoride is costly to manufacture by the process described in the patent specification and that the yield of $TiF_4$ is very low. The vapour pressure of pure ferric fluoride is extremely low (reportedly $6 \times 10^{-5}$ atm at 657° C.) and it is thus very difficult to obtain the vapour in high concentrations. Notwithstanding high yields reported in the patent specification, attempts to conduct the process using high purity $FeF_3$ have failed to obtain yields of titanium tetrafluoride even as high as 10% of that present in ilmenite by means of this reaction at temperatures as high as 850° C., irrespective of whether the substantially reaction was substantially attempted in an atmosphere of air, nitrogen, or under evacuated conditions. The low yields of titanium tetrafluoride were contaminated with up to 75% of iron compounds.

The inventor in a subsequent scientific publication in the Journal of Fluorine Chemistry [J. Fluorine Chemistry, 5 (1975), 93] reports minimum (virtually zero) reaction between $TiO_2$ and $FeF_3$. The published paper shows the use of a microbalance. The use of commercial grade $FeF_3$ as reported in the patent may have resulted in the generation of hydrogen fluoride or some other reactive gaseous fluoride which reacted with the $TiO_2$ in the ilmenite to produce $TiF_4$. As stated above high purity $FeF_3$ does not produce a significant yield of $TiF_4$. It is impossible to know what impurities in the commercial grade $FeF_3$ might have led to the reported reaction of that material with ilmenite. The method of regeneration of $FeF_3$ described in the above paper, namely heating of the ferric residue with ammonium bifluoride ($NH_4HF_2$) would be expected to yield fairly high purity $FeF_3$ which would not be expected to be effective in its subsequent reaction with ilmenite.

Australian Patent 542,764 describes a process in which a fluorosilicate is produced from effluent gases in a phosphate plant. Fluorosilicate provides a convenient and economic source of silicon tetrafluoride. That patent indicated reaction between silicon tetrafluoride at atmospheric pressure in the presence of $O_2$ and metal oxides including titanium dioxide at 600°-800° C.

This is not in accord with available published thermodynamic data which indicate that the reaction:

$$SiF_4 + TiO_2 = TiF_4 + SiO_2 \qquad (5)$$

has a positive free energy of about 20 KCal/mole $SiF_4$ under standard conditions thereby suggesting that such a reaction ought not to proceed at all. Experimental studies by OPALOVSKY et al (Journal of Thermal Analysis Vol 15 [1979] Pages 66-77) yielded no evidence of the reaction at 400°-800° C.

An object of the present invention is to provide a method for the extraction of titanium products from titaniferous materials which avoids at least some of the disadvantages of prior art.

DISCLOSURE OF THE INVENTION

According to one aspect, the invention consists in a method for treating a titaniferous solid containing titanium (IV) oxide, said method comprising the steps of (a) exposing the solid to silicon tetrafluoride gas at a temperature of at least 800° C. and at a pressure of at least 1 atmosphere at an interface whereby to produce titanium tetrafluoride vapour; and (b) rapidly removing the titanium tetrafluoride vapour produced from the interface. As herein used, the term "titanium tetrafluoride" includes, where the context admits, fluorides of titanium in which the titanium to fluoride ratio is not so high as 4:1.

Reaction between the solid titaniferous material and the gaseous silicon tetrafluoride takes place at a reaction zone at, or in the immediate vicinity of, the solid/gas interface. The interface may be at the surface of particles of a solid within the bed, or may be within the particles in the case of porous or sintered particles. The solid may be in a fluidized or fixed bed and inert solid diluents may be present.

Desirably the titanium tetrafluoride is rapidly removed from the reaction zone by condensation of the vapour onto a surface maintained at a temperature below its condensation temperature, the surface being situated sufficiently far from the reaction zone so as not to quench the reaction but sufficiently close to the reaction zone so as to favour removal of titanium tetrafluoride produced in the reaction zone.

According to a second aspect the invention consists of a method according to the first aspect wherein the titaniferous material contains iron in the ferrous state, comprising the step of pre-treating the titaniferous material to oxidize the iron from the ferrous to the ferric state.

For preference the titaniferous material is ilmenite or the like and is pre-roasted in air or oxygen to convert substantially iron (II) to iron (III) oxide. Desirably the ilmenite is ground prior to pre-roasting. For preference, also, the reaction with silicon tetrafluoride is conducted in an atmosphere free of oxygen at temperatures of from 800° C. to 1200° C. and at an $SiF_4$ pressure up to several atmospheres.

The product titanium tetrafluoride may be purified by repeated sublimation and condensation. It is then hydrolysed in sub-stoichiometric proportion prior to secondary purification to recover titanium dioxide.

Hydrogen fluoride is produced during hydrolysis which may be reacted with by-product silica to reconstitute silicon tetrafluoride for recycling if required.

Processes according to the present invention provide excellent mass transfer in the reaction zone since the silicon tetrafluoride is a gas at the reaction temperature and can be employed in a gas stream used to fluidize the titaniferous material. The reaction products are readily separable. The residue including any iron fluoride remains substantially as a solid, the titanium tetrafluoride product is rapidly removable from the reaction zone as a vapour and is readily separable by condensation (or if necessary by repeated sublimation and condensation) from residual silicon tetrafluoride gas and from silica formed in the reaction.

Usually little of the iron in the residue is converted to the fluoride and hence the residue may be capable of disposal as solids with no further treatment. Where the fluoride level is unacceptably high, the residue containing iron fluoride can be pyrohydrolysed with steam at temperatures of about 800°-1000° C. to give aqueous hydrogen fluoride, which can be used to generate $SiF_4$ (equation 7) which can be recycled, as well as iron oxide which can be sold or dumped, depending on its purity.

BRIEF DESCRIPTION OF THE DRAWINGS

Preferred embodiments of the invention will now be described by way of example only with reference to the accompanying drawings wherein.

PREFERRED EMBODIMENTS OF THE INVENTION

By way of example, various embodiments of a method according to the invention will now be described with reference to various examples.

The reactor used in the laboratory experiments is made of monel in some cases and nicrofer 6020 in others. It comprises a tubular chamber defined by a thick wall, closed at the lower end, and having a reactor flange at its upper end to which, in use, is bolted a reactor head which is connected to a manifold and to which is mounted a cold finger. The cold finger extends into the tubular chamber, is also of monel or nicrofer 6020 construction, and has a water inlet tube extending internally axially to near the lower end of the finger interior and a water outlet.

The reactor is provided with a heater or surrounding furnace and is fitted with a thermocouple which in use is mounted in a thermocouple well.

Material to be treated is contained in a cup made from a nickel containing alloy which may be raised above the floor of the reactor by means of a spacer.

Figure 3:
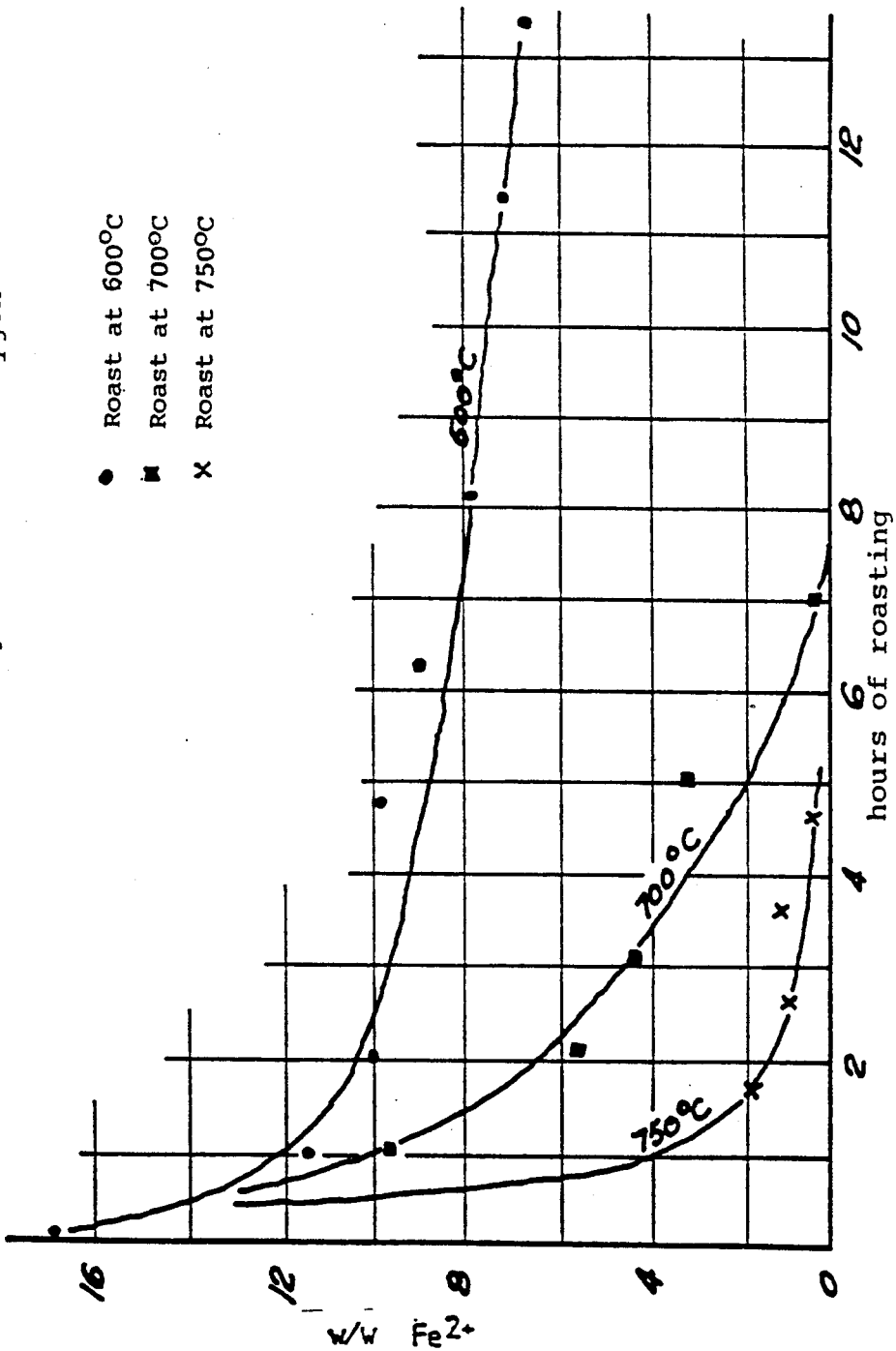
FIG. 3 is a graph showing the results of roasting ilmenite in oxygen at the specified conditions and having the weight ratio of iron (II) to total iron on the ordinate and hours of roasting on the abscissa.
Figure 4:
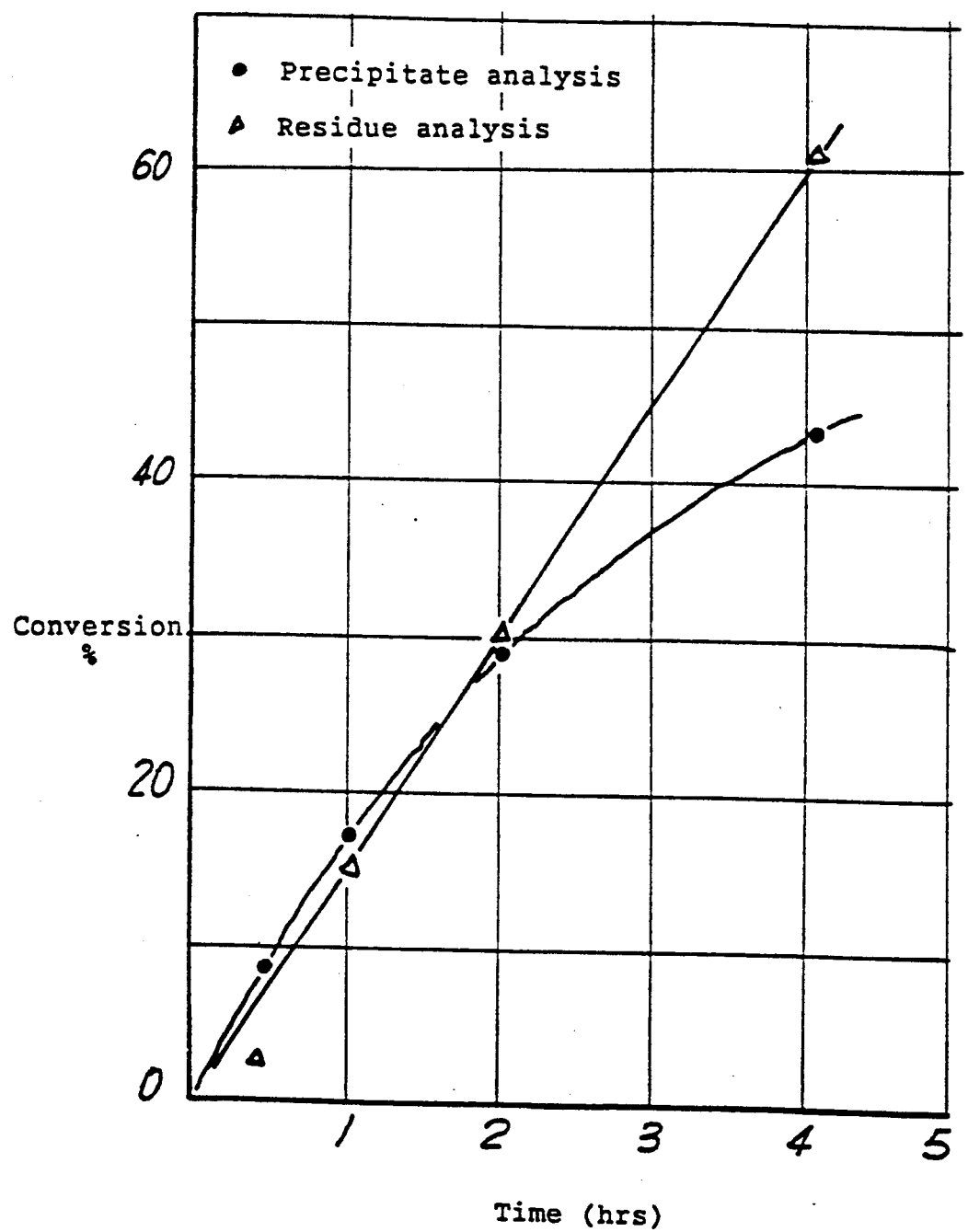
FIG. 4 is a graph showing the conversion of $TiO_2$ in ilmenite with time at the conditions specified and showing percentage conversion on the ordinate and time on the abscissa.

A sample of ilmenite was first pre-treated by grinding and roasting. Grinding was conducted by hand or by grinding in a ring mill for three minutes and the resulting particle size distribution is shown in FIG. 3. The ground ilmenite was then roasted for a sufficient time and at a temperature sufficient to convert substantially all iron (II) present to iron (III). The proportion of iron (II) in the sample as a function of time at various temperatures is shown in FIG. 4. A roasting time in excess of four hours in oxygen enriched air at from 700° C. to 750° C. achieved substantial conversion of iron present to ferric iron ($FeO/FeO_2O_3 < 1\%$) but other roasting conditions could be chosen.

Experiments indicate that pre-roasting the ilmenite promotes disruption of its crystal structure and thus improved access of silicon tetrafluoride in the gas phase to titanium dioxide situated within the solid ilmenite matrix. Additional experimental evidence shows that pre-roasting minimizes reduction of the titanium dioxide during subsequent reaction with $SiF_4$ and importantly, permits reaction with silicon tetrafluoride to be conducted in an atmosphere substantially free of oxygen gas, thus minimizing equipment corrosion problems. Tests on non pre-roasted ilmenite in the presence of oxygen led to significant corrosion of the monel reactor. ilmenite was found to have a relatively inactive surface and grinding prior to pre-roasting was found to improve the subsequent reactivity.

A pre-weighed quantity of the pre-roasted ilmenite was spread on the bottom of a container in the reactor which was then assembled with the reactor head and tested under pressure and evacuation. The reactor was provided with a selected atmosphere.

The reactor was then heated to a desired temperature. Although many of the experiments reported herein were conducted at 800° C. to enable comparative studies to be maintained, it is preferred that the reaction of the invention be conducted at temperatures above 800° C. It was determined that under the operating conditions the process was reaction rate controlled and hence would certainly be favoured by higher temperatures. At temperatures below 800° C. there is evidence of ilmenite sintering, a process which is minimised at higher temperatures.

The cold finger of the reactor was maintained at a substantially lower temperature below the condensation temperature of titanium tetrafluoride using cold water as a coolant. Subsequently the reactor was cooled and purged. The ilmenite residue was retained for analysis and the titanium tetrafluoride yield was analysed by recovery of titanium tetrafluoride from the cold finger and other interior parts of the reactor.

Recovery was conducted by careful washing whereby the titanium tetrafluoride was hydrolysed and reacted with ammonia, yielding a precipitate which was dried and weighed as titanium dioxide.

As will be understood by those knowledgeable in the chemistry of fluorine compounds, these materials require to be handled by use of appropriate techniques in order to be used safely. Those skilled in the art will have no difficulty in supplementing the above description and ensuring that adequate safety precautions are taken.

Both the residue in the reactor and the recovered titanium dioxide hydrolysate precipitate were analysed using XRF techniques and the results compared with analysis of the starting material. Discrepancy between the results calculated from the loss of Ti from the loss of the final residue and; from the $TiO_2$ precipitate recovery are attributable in part to reaction of titanium tetrafluoride with surface oxides on the reactor wall or to formation of compounds such as titanium oxidedifluoride ($TiOF_2$) which are less volatile than titanium fluoride and which would condense on the reactor walls and be less susceptible to hydrolysis than titanium tetrafluoride.

It has been found that higher yields are obtained when the reaction is conducted at temperatures above 800° C. The tendency for corrosion of materials of construction by fluorine compounds also increases with temperature and tends in practice to place an upper limit on the temperature which can be used with this type of equipment.

A substantial number of alloys has been tested and it has been found that reactors constructed from nicrofer 6020 are resistant to the chemicals involved at temperatures above 800° C. in comparison with, for example, monel metal which would typically be recommended for such purpose and in comparison with other metals tested.

Temperatures of 850° C. and 900° C. have been used and the results obtained indicate that yield increases with temperature. Additionally the use of elevated temperatures has been shown to minimize vapour phase transport of compounds such as $FeSiF_6$ which, if they vaporized from the reaction zone with the volatile $TiF_4$, would contaminate the condensed product $TiF_4$.

Figure 5:
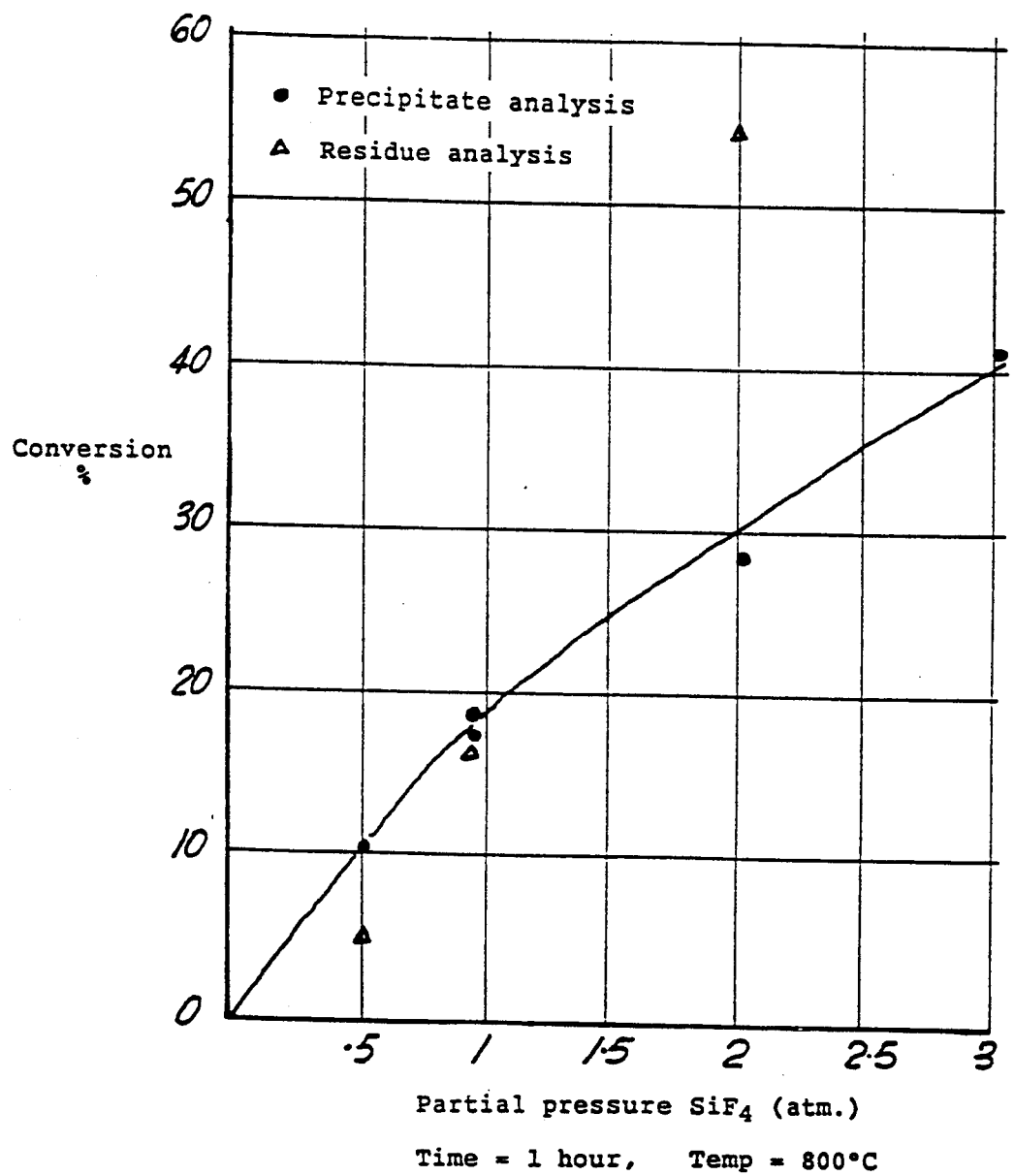
FIG. 5 is a graph showing the effect of the variation of $SiF_4$ pressure and showing percentage conversion on the ordinate and partial pressure $SiF_4$ on the abscissa at the conditions specified.

Table 1 and FIG. 5 show the percentage of $TiO_2$ converted to $TiF_4$ with time at the conditions specified. One curve of FIG. 5 is based on residue analysis while the other is based on analysis of the titanium dioxide precipitate recovered from the hydrolysate. The curves indicate a strong growth in reaction conversion (yield of $TiF_4$) with time. No evidence of slowing of the reaction over a four-hour period was observed. This indicates that the shift from chemical equilibrium was continuous and with sufficient time at an appropriate temperature and pressure very high yields would be obtained—considerably higher than in the conventional processes.

Table 2 and FIG. 6 show that an increase in silicon tetrafluoride partial pressure at the specified conditions increases the conversion significantly and indicates that the process is dependent on to reaction rate. Diffusion in the gas phase did not appear to be a limiting factor under the experimental conditions used.

Experiments were conducted in an inert atmosphere and in an oxygen-containing atmosphere. The presence of oxygen in the gas phase was found (Table 3) to be beneficial in preventing a reduction of Ti(IV) to Ti(III) which would inhibit conversion to $TiF_4$. Additionally, the oxygen is thought to lead to promotion of an oxyfluoride compound which may beneficially participate in the process. However, as indicated above, the presence of oxygen adversely results in high levels of corrosion of materials of reactor construction and it is considered preferable to exclude oxygen gas from the reactor and to pre-roast the ilmenite with air or oxygen. The oxygen is then chemically bound in the ilmenite as ferric oxide so as to minimize the reduction of Ti(IV) by ferrous ion which could occur if untreated ilmenite were to be reacted at elevated temperatures with $SiF_4$.

Pre-fluorination of the ilmenite with silicon tetrafluoride for three hours at 600° C. was conducted (Table 4)

to establish if ferric oxide in the ilmenite competes with titanium dioxide for silicon tetrafluoride and to determine whether this reaction causes further disruption of the ilmenite crystal lattice, further increasing the availability of Ti(IV) for reaction with $SiF_4$.

The results indicate that a small improvement in conversion is obtained by pre-fluoridation.

The reaction was also conducted utilizing pure $TiO_2$ in the solid phase (in the absence of iron but in the presence of oxygen) with the results shown in Table 5 from which it appears that iron, per se, does not play a significant role.

Table 6 shows the effect of re-crushing residual ilmenite after reaction. In run M66 reaction was stopped after one hour, the sample cooled, the residual ilmenite re-ground, and then the reaction was continued for a second hour. The results may be compared with run M52 in which the reaction was continued for two hours without interruption under identical conditions. There is no significant difference in the results.

Further experiments were conducted in a larger reactor with a scale factor of 25:1 in terms of feedstock solid. The reactor did not originally have a cold finger but instead had a cooled head and it also had provision for raising the solid feed closer to the head.

Initial experiments in the new reactor with the ilmenite sitting in the bottom of the reactor yielded conversions of less than 1% of titanium dioxide in the ilmenite to titanium tetrafluoride.

It was found that selection of an appropriate distance of separation between the reaction zone (that is to say the zone in which the ilmenite reacts with the silicon tetrafluoride) and the condensation zone in which titanium tetrafluoride vapour condenses to titanium tetrafluoride solid is of importance for a high conversion yield.

If the titanium tetrafluoride product remains in the reaction zone, an equilibrium is apparently rapidly established in which the concentration of titanium tetrafluoride is extremely low but which prevents the formation of further product. In the reactor used in the experiments the presence of a cold surface within 7 cms. of the reaction bed is sufficient to remove $TiF_4$ at an adequate rate from the reaction zone so as to continuously disturb the equilibrium thereby driving the reaction towards higher conversion to $TiF_4$. Provided adequate cooling surface is available the conversion increases with reaction time (assuming reaction rate control and assuming that interparticle diffusion, or core diffusion do not become limiting factors). It appears that distances between the reaction zone and condensation surface of 10 cms. or more in the batch reactor described with a static bed may not remove the product from the reaction zone with sufficient speed and consequently results in lower yields.

It is envisaged that on a commercial scale the reaction may be conducted with a continuous reactor and gas flow may be used to provide removal of titanium tetrafluoride (and any $TiOF_2$) to disturb the reaction equilibrium. The presence of a nearby well-cooled surface for vapour condensation of the titanium fluorides would enhance the dis-equilibrium and would improve yields.

It also appears that if a cold surface is located too close to the reaction zone, the temperature of gas in the vicinity of the reaction bed is lowered and conversion is adversely affected.

In summary, it has been found that reaction between silicon tetrafluoride gas and a titaniferous solid can be conducted with good conversion to titanium tetrafluoride notwithstanding thermodynamic predictions to the contrary. According to the invention high conversion yields of titanium tetrafluoride may be achieved by conducting the reaction at temperatures of 800° C. or higher. Experimental evidence shows that higher temperatures reduce contamination of $TiF_4$ sublimed from the reaction zone by vapour phase transport of iron as $FeSiF_6$. Use of temperatures of 900° C. to 1200° C. appears to be feasible and beneficial the main constraining factor on temperature elevation being the availability of materials suitable for handling fluorine compounds at those temperatures.

The reaction is favoured by high partial pressure of silicon tetrafluoride. Pressures in excess of 1 atmosphere and more, preferably in excess of 3 atmospheres are beneficial. Rapid removal to product titanium tetrafluoride vapour is necessary to maintain dis-equilibrium and drive the reaction towards conversion of titanium tetrafluoride. The product vapour is rapidly removed on a small batch scale by condensation on a cold surface adjacent to the reaction zone. The distance of the condensation surface of the condensor from the reaction zone appears to be critical when this is used as a means for driving the reaction. Too great a distance is ineffective and too small a distance tends undesirably to lower temperature in the reaction zone. Under the optimum conditions, conversion of more than 70% of the titanium can be achieved within a period of about four hours.

Pre-roasting of the feed titaniferous material is desirable. It appears that the action of an oxidant in the process is highly desirable and possibly essential in order to ensure that titanium in the solid reacting material is not reduced below oxidation state IV as that inhibits conversion of Ti to the tetrafluoride. Oxygen or air can be used in a mixture of $SiF_4$ for this purpose but these tend to cause undesirable corrosion. Pre-roasting of the feed material in air or oxygen achieves two purposes. Firstly, Fe(II) in the ilmenite (or other titaniferous material) is oxidized to Fe(III) causing disruption of the crystal lattice of ilmenite and enhancing the accessibility of gaseous $SiF_4$ to Ti in the mineral. Secondly, if ilmenite (or any other iron-bearing titaniferous mineral) were to be heated to reaction temperature with $SiF_4$ in the absence of air or $O_2$, Fe(II) in the ilmenite could reduce Ti(IV) in a solid state reaction and reduce the effectiveness of conversion of Ti to $TiF_4$. In such cases pre-roasting, in causing oxidation of Fe(II) to Fe(III) minimizes this possibility. Because the Fe(III) can be reduced to Fe(II) during the reaction, re-roasting may be necessary. Preferably the ratio of Fe(II) to Fe(III) in the roasted feed material is less than 1%. Pre-fluoridation of ilmenite by heating with $SiF_4$ at a lower temperature than the reaction temperature is also beneficial.

It is believed that $SiF_4$(g) in the reactor reacts with $TiO_2$(s) at the surface and probably within the pores of the ilmenite and it is possible that this reaction is first order with respect to the gas phase reactant $SiF_4$. Consequently, the rate of production of $TiF_4$ is dependent upon temperature and concentration of $SiF_4$ in the gas phase in the reaction zone. The $TiF_4$ formed diffuses by molecular diffusion (or is carried by a gas flow) to the cold surface and provided the $TiF_4$ is removed, the reaction can be driven to high yields.

As will be apparent to those skilled in the art from the teaching hereof, the reaction can be scaled up and can be conducted on a commercial scale in apparatus of a form quite different from that described herein. For example, the reaction could be conducted on a continuous basis in a fluidized bed reactor or in a reactor provided with means for retaining particles in a bed through which silicon tetrafluoride gas was passed at high velocity. The titanium tetrafluoride product vapour could be rapidly removed from the bed by high gas flow rates with respect to the bed and could be condensed in a separate chamber remote from the reaction zone. Preferably a reactor having a condensor in close proximity to the reaction zone would be employed to rapidly remove the vapour by condensation, the condensor being provided with means for continuous removal of the solid, for example in the form of a cooled rotating drum having a portion of its cooled surface inside the reactor and closely exposed to the reaction zone and having a portion outside the reactor and accessible to scrapers or washers, both portions being within sealed enclosures. The present invention is not limited to any particular method for rapid removal of the product vapour.

Figure 1:
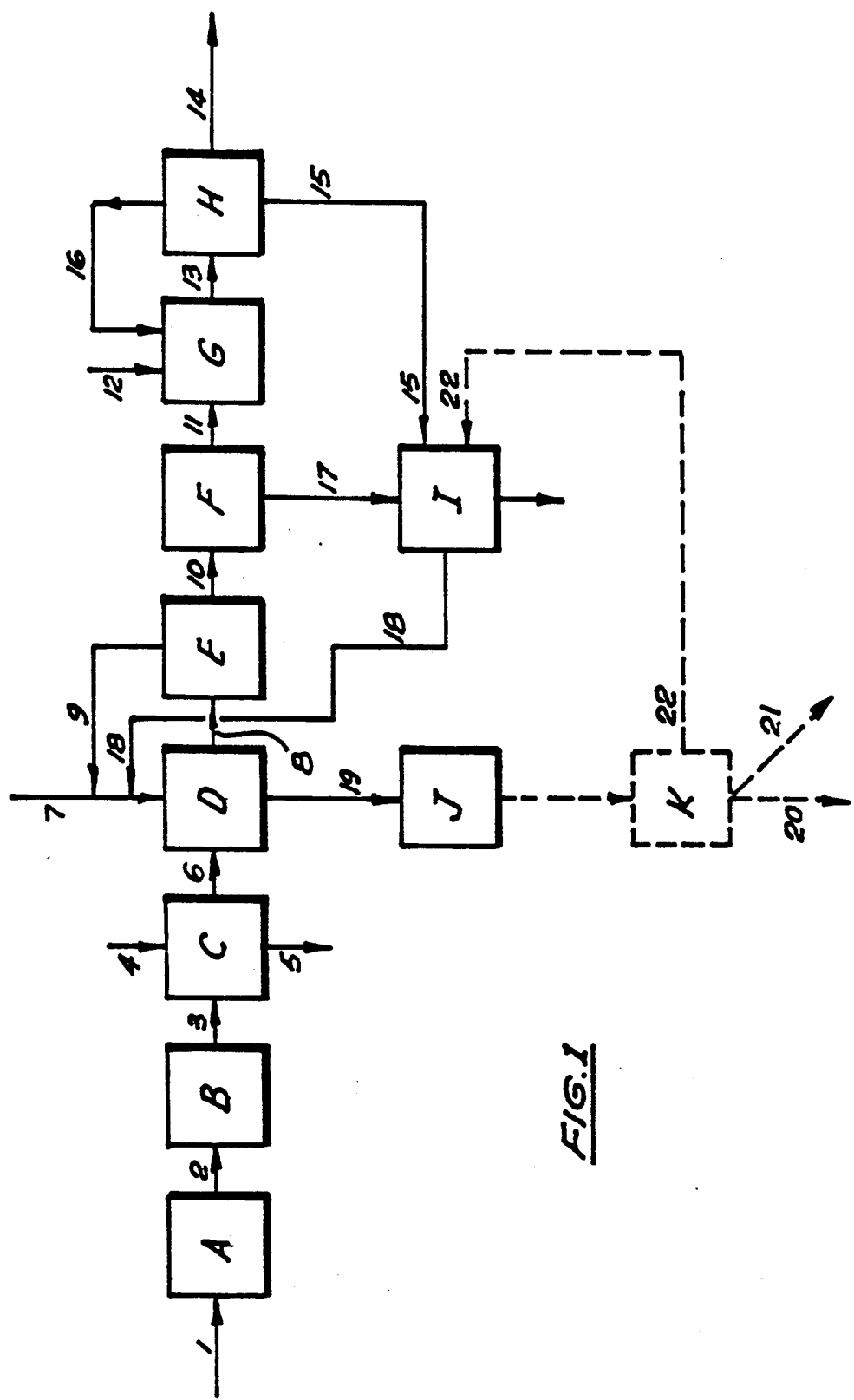
FIG. 1 is a block flow diagram of a manufacturing process according to the invention.
Figure 2:
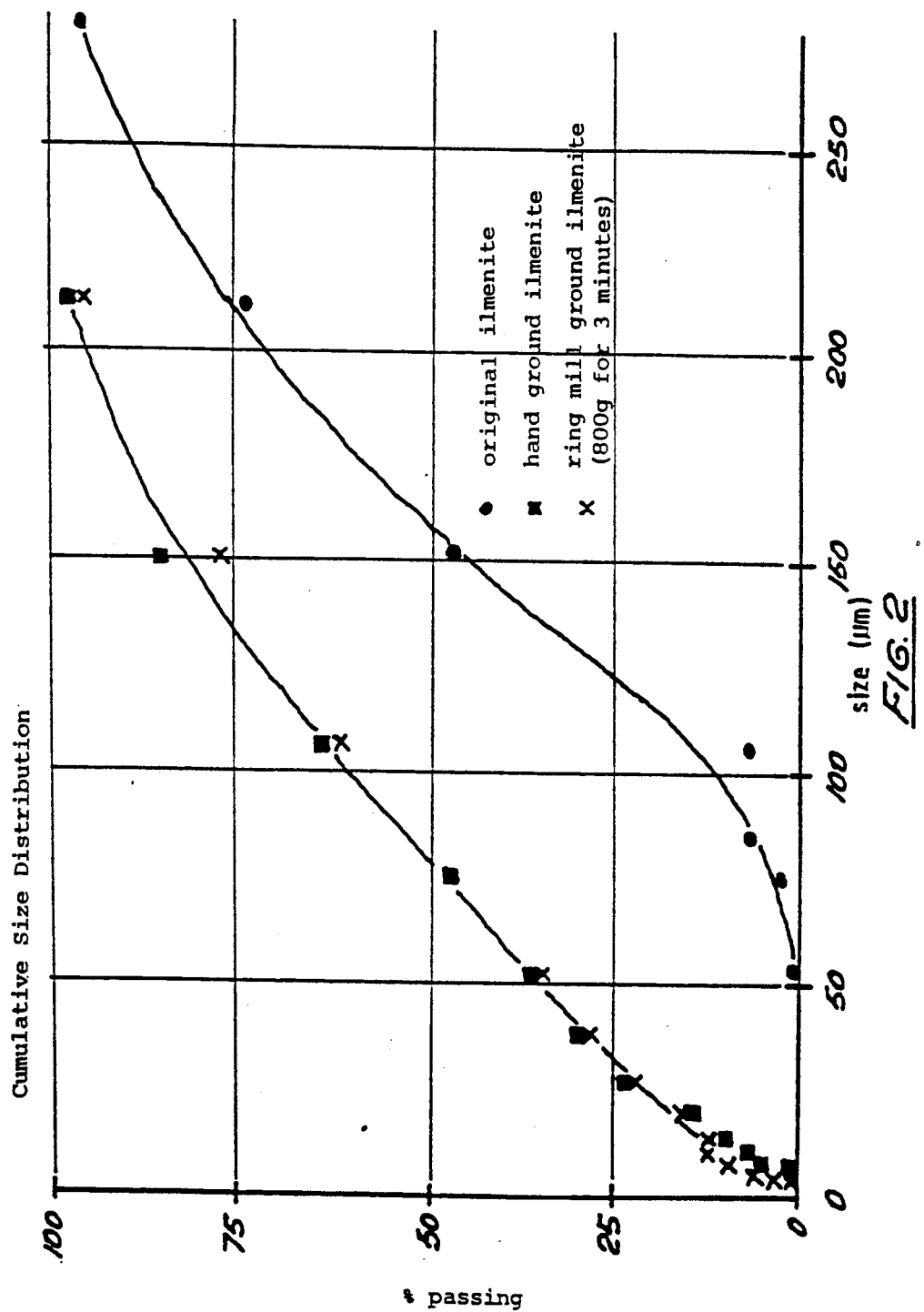
FIG. 2 is a graph showing the cumulative size distribution of a ground raw material on the ordinate and sieve micron size on the absissa.

With reference to FIG. 1 there is shown a flow sheet showing schematically an embodiment of a process according to the invention as envisaged on a commercial scale.

The starting material for the embodiment shown in FIG. 1 is ilmenite 1 which contains iron (II) oxide, iron (III) oxide and titanium (IV) oxide in a lattice structure. However, other titanium bearing minerals may be used as a feed.

Ilmenite 1 is first concentrated and beneficiated by conventional methods in a concentration stage A.

The concentrate 2 is ground at B and ground concentrate 3 is roasted at C in air or oxygen 4 in a kiln or the like at a temperature in excess of 700° C., for a time sufficient to convert iron (II) oxide to iron (III) oxide. Excess air 5 may be recycled. Roasting at C serves to prevent subsequent reduction of titanium (IV) by iron (II) compounds. The roast 6 has a lattice structure which is believed to be more permeable than the starting material and which can be described as "$Fe_2O_3 2-TiO_2$", although the precise composition of the lattice structure may vary from this idealized formula.

The ilmenite roast 6 is next treated, for example in a fluid bed reactor at D, with a stream of silicon tetrafluoride 7 under conditions previously herein discussed.

The reaction product 8 containing titanium tetrafluoride vapour is separated from reaction product silica and unreacted $SiF_4$ by condensation at E, the unreacted $SiF_4$ stream 9 being recycled to reactor D. It will be understood that processes D & E may be conducted within a single stage apparatus. Product stream 10 from reactor D contains $TiF_4$ and $SiO_2$ which can be separated from each other or any solid iron compounds on the condensing surface by a resublimation step F combined optionally with filtration. The $TiF_4$ vapour 11 from resublimation F is hydrolysed at G with water 12 to produce hydrolysis products 13 including $TiO_2$ and hydrogen fluoride, either in aqueous or anhydrous form. Hydrolysis products 13 undergo purification and separation H to produce pure $TiO_2$ product 14, a stream 15 of hydrogen fluoride, and a stream 16 of residual $TiF_4$ which is recycled to hydrolysis plant G.

The hydrogen fluoride stream 15 is combined with silica 17 recovered from resublimation and filtration step F in a regeneration step I to produce a further stream 18 of $SiF_4$ which may be combined with stream 9 and $SiF_4$ make up stream 7 for use in reactor D.

Residues 19 from reactor D include $SiO_2$, residue ilmenite, absorbed $SiF_4$, metal fluorides, etc. and may optionally undergo further treatment J and/or pyrohydrolysis K to produce silica 20 and metal oxides 21 and an hydrogen fluoride recovery stream 22 which may be combined with stream 15.

By-product ferric fluoride may be treated in a variety of ways. For example, it may be pyro hydrolysed with steam at for example 1000° C. to produce ferric oxide and hydrogen fluoride which in turn may be reacted with silica to produce silicon tetrafluoride to be recycled.

The products of the process, titanium dioxide 14, ferric oxide 21 and silica 20 are all of value.

The process for producing pure titanium dioxide and silica from ilmenite and silicon tetrafluoride may be undertaken in equipment which is designed to enhance the phenomena described in this specification. In particular it is envisaged that the reactor D will involve a fluidised bed with a moving heat transfer surface for titanium tetrafluoride condensation to enhance the move away from reaction equilibrium. Alternatively a rotating zoned fluidized bed operating in close proximity to appropriate cooled surfaces is possible.

Because of the relative volatility of $SiF_4$ (very high), $TiF_4$ and oxyfluorides of titanium (medium) and iron compounds and silica (very low) solid product purification F is achieved by repeated sublimation and condensation taking advantage of cyclic heating and cooling.

The sub-stoichiometric hydrolysis step G may involve a venturi hydrolyser to enable good separation of the recycle stream. Following hydrolysis a final purification step may be necessary to obtain pure $TiO_2$.

The process requires special containment at the high temperatures involved and it has been demonstrated that high quality nickel alloys such as NICROFER are suitable under the operating conditions.

Advantages of the present invention stem from the following factors alone or in combination.

(a) The ability to use as a feedstock any titaniferous mineral regardless of Ti content.
(b) The physical and chemical disruption of the ilmenite lattice and the conversion of iron in the ilmenite from the ferrous to the ferric state by roasting the crushed ilmenite. Roasting in oxygen or air provides a host lattice of fully oxidised iron compounds thereby minimising the ability of Ti(IV) to be in the reduced state in the subsequent reaction with $SiF_4$.
(c) Pre-treatment of the feed at a lower temperature by pre-fluoridation improves the conversion.
(d) The use of gaseous silicon tetrafluoride as a reactant it being volatile and cheap to produce. Silicon tetrafluoride is not nearly as corrosive, toxic or environmentally unacceptable as other fluorides which could be used in the process as alternative reactants. Silicon tetrafluoride can be generated from anhydrous hydrogen fluoride or aqueous hydrogen fluoride each of which may be produced in the process. $FeF_3$ and alternative fluorides require for their production the very expensive chemicals anhydrous hydrogen fluoride or $F_2$.
(e) The ability to conduct the fluoridation process in the absence of gaseous phase oxygen or air.
(f) The ability to produce large quantities of pure titanium tetrafluoride which can be used as an intermediate in the subsequent production of titanium compounds, in particular pure titanium dioxide, titanium metal and alloys of titanium.

(g) The production of $TiF_4$ as described involves the continuous disturbance of chemical equilibrium and accordingly maximises the conversion.

(h) Silica, produced in the reaction as in equation 5, can be recovered and reacted with hydrogen fluoride, formed in the hydrolysis of $TiF_4$:

$$TiF_4 + 2H_2O \rightarrow TiO_2 + 4HF \qquad (6)$$

Silica and hydrogen fluoride react to give $SiF_4$ which can be re-cycled in the process.

$$SiO_2 + 4HF \rightarrow SiF_4 + 2H_2O \qquad (7)$$

(i) The final by-products ($Fe_2O_3$ and $SiO_2$) appear to be environmentally acceptable and all intermediate products can be recycled thereby the ilmenite is separated into its constituent oxides.

(j) The process may incorporate a fluidised bed reactor having novel features which promote chemical equilibrium disturbance.

(k) The fluoridation process can be safely contained without corrosive, attack in a high grade nickel alloy such as Nicrofer and similar materials which can be used at the high temperatures which favour high yields.

(l) The titanium tetrafluoride produced in the process is easily separated from the other products by condensation and resublimation in heat transfer equipment having novel features.

The process herein described may be varied to an extent which will be apparent to those skilled in the art from the teaching hereof without departing from the inventive concept and all such variations are deemed within the scope of this disclosure.

TABLE 1

| RUN NUMBER | REACTION TIME (HOUR) | CONVERSION FROM PRECIPITATE (%) | CONVERSION FROM RESIDUE (%) |
|---|---|---|---|
| M53 | 0.5 | 8.83 | 2.06 |
| M54 | 1.0 | 17.36 | 16.37 |
| M52 | 2.0 | 29.07 | 29.68 |
| M60 | 4.0 | 43.38 | 61.85 |

$P_{SiF_4} = 1$ ATM
TEMP - 800° C.

TABLE 2

| RUN NUMBER | $SiF_4$ PARTIAL PRESSURE (ATM) | CONVERSION FROM PRECIPITATE (%) | CONVERSION FROM RESIDUE (%) |
|---|---|---|---|
| M56 | 0.5 | 10.40 | 5.00 |
| M54 | 1.0 | 17.36 | 16.37 |
| M69 | 1.0 | 18.90* | N/A |
| M61 | 2.0 | 28.93 | 54.11 |
| M68 | 3.0 | 41.60* | N/A |

TIME = 1 HOUR
TEMP = 800° C.
*ASSUMED TO CONTAIN 20% IMPURITY

TABLE 3

| RUN NUMBER | PRE-HEAT ATMOSPHERE | REACTION ATMOSPHERE | CONVERSION FROM PRECIPITATE (%) | CONVERSION FROM RESIDUE (%) |
|---|---|---|---|---|
| M54 | $N_2$ | $SiF_4$ (1 ATM) | 17.36 | 16.37 |
| M63 | $N_2$ | $SiF_4 + O_2$ (1 & 0.5 ATM) | 28.87 | 34.83 |
| M69 | $N_2 O_2$ | $SiF_4$ (1 ATM) | 18.90 | N/A |

TIME = 1 HOUR
TEMP = 800° C.

TABLE 4

| RUN NUMBER | PRE-HEAT ATMOS. | SOLID PHASE | GAS PHASE | CONVERSION FROM PRECIPITATE (%) | CONVERSION FROM RESIDUE (%) |
|---|---|---|---|---|---|
| M58 | $O_2$ | PRE-FLUORIDATED ILMENITE | $SiF_4$ (2 ATM) | 27.12 | 50.78 |
| M59 | $O_2$ | ILMENITE | $SiF_4$ (2 ATM) | 23.04 | 44.44 |

TIME = 1 HOUR
TEMP = 800° C.

TABLE 5

| RUN NUMBER | SOLID PHASE | GAS PHASE | CONVERSION FROM PRECIPITATE (%) | CONVERSION FROM RESIDUE (%) |
|---|---|---|---|---|
| M64 | $TiO_2$ (100 mg) | $SiF_4 + O_2$ (1 & 0.5 ATM) | 12.80 | — |
| M63 | ILMENITE (200 mg) | $SiF_4 + O_2$ (1 & 0.5 ATM) | 27.87 | 34.84 |

TIME = 1 HOUR
TEMP = 800° C.

TABLE 6

| RUN NUMBER | SOLID PHASE | GAS PHASE | CONVERSION FROM PRECIPITATE (%) | CONVERSION FROM RESIDUE (%) |
|---|---|---|---|---|
| M54 | ILMENITE | $SiF_4$ (1 HOUR) | 17.36 | 16.37 |
| M52 | ILMENITE | $SiF_4$ | 29.07 | 29.68 |

TABLE 6-continued

| RUN NUMBER | SOLID PHASE | GAS PHASE | CONVERSION FROM PRECIPITATE (%) | CONVERSION FROM RESIDUE (%) |
|---|---|---|---|---|
| M66 | ILMENITE | (2 HOUR) $SiF_4$ (1 HOUR) | — | 11.21 |
|  | RE-USED ILMENITE | $SiF_4$ (1 HOUR) | 32.53 | 28.57 |

TEMP = 800° C.

We claim:

1. A method for treating a titaniferous solid containing titanium (IV) oxide, said method comprising the steps of (a) reacting the titanium (IV) oxide with silicon tetrafluoride gas at a temperature of at least 800° C. and at a pressure of at least one atmosphere at a gas-solid interface whereby to convert the titanium (IV) oxide to titanium tetrafluoride vapour; and (b) removing the titanium tetrafluoride vapour produced from the interface.

2. A method according to claim 1 wherein the reaction is conducted at from 800° C. to 1200° C. in an atmosphere free of oxygen.

3. A method according to claim 1 wherein the titaniferous material contains iron in the ferrous state, further comprising the step of pre-treating the titaniferous material to oxidize iron from the ferrous to the ferric state.

4. A method according to claim 3 wherein the titaniferous material is ilmenite and the step of pre-treating is conducted by roasting in air or an oxygen containing atmosphere.

5. A method according to claim 4 wherein the step of pre-treating is conducted by roasting in air or an oxygen containing atmosphere at or above 700° C.

6. A method according to claim 1 wherein the titanium tetrafluoride is removed from the reaction zone by lowering the temperature of the vapour to or below the condensation temperature of titanium tetrafluoride.

7. A method according to claim 1 wherein the titanium (IV) oxide is reacted with silicon tetrafluoride while in a packed or fluidized bed.

8. A method according to claim 1 wherein the solid titaniferous material is in a sintered state.

9. A method according to claim 6 wherein the titanium tetrafluoride vapor is removed from the reaction zone by cooling at a distance sufficiently far from the reaction zone so as not to quench the reaction of step (a) but sufficiently close to the reaction zone so as to favor removal of titanium tetrafluoride produced in the reaction zone.

10. A method according to claim 1 wherein the titanium tetrafluoride is purified by repeated sublimation and condensation.

11. A method according to claim 1 wherein the titanium tetrafluoride is hydrolyzed in sub-stoichiometric proportions to recover titanium dioxide.

12. A method according to claim 11 wherein hydrogen fluoride produced during hydrolysis is reacted with by-product silica to reconstitute silicon tetrafluoride.

13. A method according to claim 1 wherein step (a) is conducted in a reaction chamber having an internal surface made of a nickel chromium iron alloy.

14. A method according to claim 1 further comprising a step in which silica is treated with hydrogen fluoride to produce silicon tetrafluoride.

15. A method according to claim 14 wherein said silica is a product of the reaction of step (a).

16. A method according to claim 14 when said hydrogen fluoride is a product of the hydrolysis reaction of said titanium tetrafluoride to titanium dioxide.

17. A method according to claim 14 wherein the silicon tetrafluoride produced is recycled as a gas for use in step (a).

18. A method for treating a titaniferous solid containing titanium (IV) oxide and ferrous iron, said method comprising the steps of:
(a) pre-treating the titaniferous material to oxidize iron from the ferrous to the ferric state by roasting in air or oxygen containing atmosphere;
(b) reacting the titanium (IV) oxide with silicon tetrafluoride gas at a temperature of at least 800° C. and at a pressure of at least one atmosphere at a gas-solid interface whereby to convert the titanium (IV) oxide to titanium tetrafluoride vapor; and
(c) removing the titanium tetrafluoride vapor produced from the interface.

19. A method according to claim 18 wherein the step of pre-heating is conducted by roasting in an oxygen containing atmosphere at or above 700° C.

20. A method according to claim 18 wherein the titanium tetrafluoride is removed from the reaction zone by lowering the temperature of the vapor to or below the condensation temperature of the titanium tetrafluoride.

21. A method according to claim 18 wherein the titanium (IV) oxide is reacted with silicon tetrafluoride while in a fluidized bed.

22. A method according to claim 18 wherein the solid titaniferous material is in a sintered state.

23. A method according to claim 18 wherein the titanium tetrafluoride vapor is removed from the reaction zone by cooling at a distance sufficiently far from the reaction zone so as not to quench the reaction of step (a) but sufficiently close to the reaction zone so as to favor removal of titanium tetrafluoride produced in the reaction zone.

24. A method according to claim 18 wherein the titanium tetrafluoride is purified by repeated sublimation and condensation.

25. A method according to claim 18 wherein the titanium tetrafluoride is hydrolyzed in sub-stoichiometric proportions to recover titanium dioxide.

26. A method according to claim 18 wherein hydrogen fluoride produced during hydrolysis is reacted with by-product silica to reconstitute silicon tetrafluoride.

27. A method according to claim 18 further comprising a step in which silica is treated with hydrogen fluoride to produce silicon tetrafluoride.

* * * * *